United States Patent [19]

Buthe et al.

[11] 4,443,207

[45] Apr. 17, 1984

[54] PROTECTIVE DEVICE FOR DRIVE SHAFT UNIVERSAL JOINT ASSEMBLY

[75] Inventors: Theo Buthe, Lohmar; Felix Mikeska, Siegburg, both of Fed. Rep. of Germany

[73] Assignee: Jean Walterscheid GmbH, Fed. Rep. of Germany

[21] Appl. No.: 281,665

[22] Filed: Jul. 9, 1981

[30] Foreign Application Priority Data

Jul. 10, 1980 [DE] Fed. Rep. of Germany ....... 3026062

[51] Int. Cl.³ .............................. F16D 3/84; F16P 1/00
[52] U.S. Cl. ..................................... 464/172; 464/175
[58] Field of Search ...................... 464/172, 173, 175; 277/212 FB

[56] References Cited

U.S. PATENT DOCUMENTS

| | | | |
|---|---|---|---|
| 2,473,618 | 6/1949 | Stillwagon, Jr. | 464/175 |
| 3,646,778 | 3/1972 | Fisher | 464/175 X |
| 4,107,952 | 8/1978 | Geisthoff | 464/175 |
| 4,338,797 | 7/1982 | Herchenbach | 464/172 X |

FOREIGN PATENT DOCUMENTS 1566735 5/1980 United Kingdom .

Primary Examiner—Stuart S. Levy
Assistant Examiner—Daniel P. Stodola
Attorney, Agent, or Firm—Toren, McGeady and Stanger

[57] ABSTRACT

A universal joint connected at one side thereof with a drive shaft having a pair of telescopic protective tubes extending thereover is protectively sealed by a protective boot which is joined with one end of the drive shaft. An annular bearing body formed on one of the telescopic protective tubes engages in an annular groove in a shank member of the universal joint and the protective boot includes a conical connecting portion extending over a connecting piece which is attached with one of the protective tubes. A securing ring is engaged in an outer groove of the connecting piece and a conical collar of the securing ring operates to press the conical connecting portion of the protective boot against a funnel-like extension of the connecting piece. The connecting piece is formed with through-holes which receive therein locking tongues formed on the annular bearing body and the securing ring includes a stop face which axially fixes the locking tongues in the through-holes.

1 Claim, 4 Drawing Figures

Fig. 1
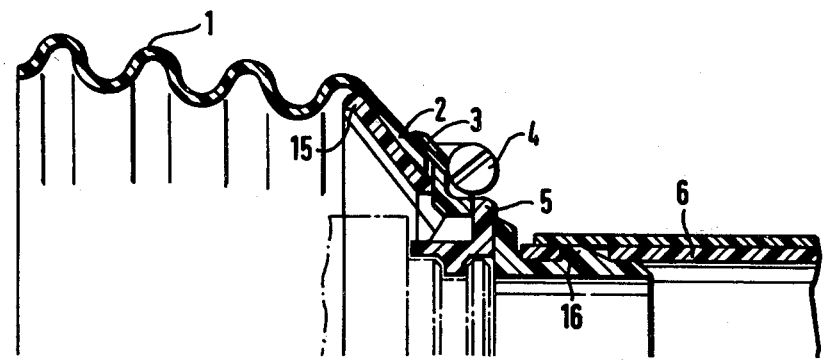
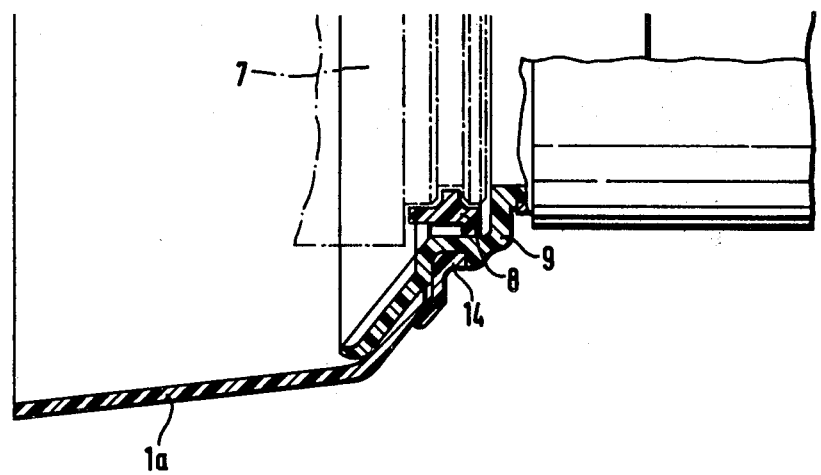
Fig. 1a

PROTECTIVE DEVICE FOR DRIVE SHAFT UNIVERSAL JOINT ASSEMBLY

The present invention relates generally to a protective device for a universal joint assembly and more particularly to a protective device for a drive shaft assembly including the universal joint assembly which connects a tractor to an agricultural implement.

The drive shaft assembly includes at least one drive shaft which is connected to one side of the universal joint and which is provided with two telescopic protective tubes surrounding the drive shaft, each of the tubes having an annular bearing body which engages into an annular groove of a shank member arranged at the respective end of the drive shaft with a connecting piece being provided having through holes for receiving locking grooves provided at the bearing body and pointing radially outwardly by means of which the respective protective tube is connected with a protective boot or funnel covering the joint. The protecting piece has a funnel-like extension of the outer circumference partially projecting into the protective funnel or boot.

A device of the type to which the present invention relates is known from British Pat. No. 1,566,735. Prior art devices of this type includes a bearing ring having three locking tongues which pass through corresponding recesses in a connecting piece. The bearing body is axially fixed by the connecting sleeve of the protective funnel. The connecting piece of such a device is provided with a funnel-like extension receiving the connecting sleeve of the protective funnel.

In known protective devices, disadvantages arise in that such devices cannot in all cases withstand loads occurring when the drive shaft is incorrectly handled. Furthermore, such devices have been found to be incapable of preventing risk of accident which may arise at the drive shaft end in the case of rapid radial movement.

In view of the basic purpose to be fulfilled by the protective funnel, it should, on the one hand, be designed so as to be of elastic material and, on the other hand, it should ensure a strong connection between the protective tube, the bearing, and the protective funnel.

The present invention is particularly directed toward provision of a protective device for a drive shaft assembly including a universal joint which, while permitting large angles of articulation, will nevertheless eliminate or reduce any risk that the protective tube or protective funnel connection will snap off or become dislodged. Furthermore, the invention is aimed toward a protective device which is capable of absorbing impacts occurring during incorrect handling of the driving assembly and of withstanding high radial and axial loads.

SUMMARY OF THE INVENTION

Briefly, the present invention may be described as a protective device for a universal joint assembly arranged as part of a drive shaft assembly connecting a tractor to an agricultural implement. Connected to at least one side of the universal joint assembly is a drive shaft of the drive shaft assembly which is surrounded by a pair of telescopic protective tubes, at least one of which is formed with an annular bearing body engaging into an annular groove formed in a shank member of the universal joint assembly. The shank member may be on the fork side of the universal joint assembly and may therefore be the joint fork shank.

The protective device is essentially comprised of a protective boot of elastic material extending to cover the universal joint and including a conical connecting portion. A connecting piece having a funnel-like extension which partially projects into the conical connecting portion of the protective boot is provided with through holes for receiving therein locking tongues formed on the annular bearing body. The conical connecting portion of the protective boot extends in the direction of the drive shaft and is supported by the funnel-like extension of the connecting piece. A securing ring is engaged within an outer groove provided on the connecting piece and the securing ring includes a stop face for axially fixing the locking tongues in the through holes. Additionally, the securing ring includes a conical collar having a conical configuration which corresponds to the configuration of the funnel-like extension of the connecting piece for holding the conical connecting portion of the protective boot against the funnel-like extension.

The through holes in the connecting piece are arranged to open toward the end of the connecting piece which is on the side of the protective tube and the through holes are formed with a length which exceeds the width of the continuous outer groove by the thickness of the locking tongues.

The advantage of the protective funnel or boot structured in accordance with the present invention is that, in the area of its connecting cone, it is completely filled by the funnel-like extension of the intermediate connecting piece and for securing the connection, provision is made for a securing ring which ensures axial fixing of the bearing ring and which clamps the conical connecting portion of the protective funnel or boot against the funnel-like extension of the connecting piece. Since the securing ring is utilized only for the purpose of effecting a securing function, it can be made of a relatively strong design to meet the requirements of the assembly.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated a described a preferred embodiment of the invention.

DESCRIPTION OF THE DRAWINGS

In the drawings:

FIG. 1 is a partial schematic sectional view illustrating a protective device in accordance with the invention;

FIG. 1a is a partial schematic sectional view illustrating another embodiment of the invention.

DETAILED DESCRIPTION OF THE PREFERRED EMBODIMENT

Figure 2:
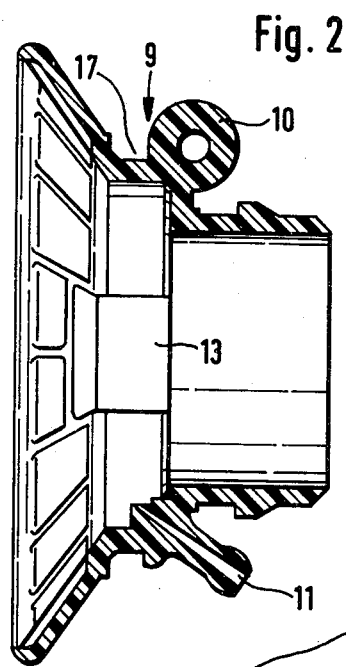
FIG. 2 is a sectional view taken through the connecting piece of the protective device.

Referring now to the drawings, a protective device structured in accordance with the present invention and illustrated in FIG. 1 is formed to include a protective funnel or boot 1 which. as shown in the upper portion of FIG. 1, may be formed with a bellows-like configuration or which, as shown in the lower half of FIG. 1, may be formed with a smooth conical wall 1a.

The protective funnel 1 extends to the left in FIG. 1 to protectively cover a universal joint assembly (not shown), a shank 7 of the joint fork of such an assembly being schematically depicted in FIG. 1.

The protective device is connected with the protective tube 6 of a drive shaft by means of a connecting assembly which includes a connecting piece 9 in which a bearing body 8 is held. The bearing body 8 by means of a neck portion pointing radially inwardly engages into an annular groove of the shank 7 of the joint fork. The connecting piece 9 is provided with through holes 13 through which pass locking tongues 5 arranged at the bearing body 8 in a manner so as to point radially outwardly.

On its side away from the protective funnel 1, the connecting piece 9 is provided with a connecting sleeve for the protective tube 6 surrounding the drive shaft. The protective tube 6 is secured against axial movement by means of a button lock 16 on the intermediate or connecting piece 9. A funnel-like extension 15 of the connecting piece 9 extends into the protective funnel 1 a sufficient distance for the part thereof adjoining the bearing to be protected against radial loads occurring in standard operation, i.e., its outer diameter is retained.

In order to fit the protective device into operative condition, the bearing body 8 which is of a slotted design is inserted into an annular groove of the joint fork shank 7 and the connecting piece 9 is continuously pushed from the protective tube end until the locking tongues 5 of the bearing body 8 rest against a boundary facing the protective tube of the respective through holes.

Subsequently, the protective funnel is pushed on against the funnel-like extension 15 of the connecting piece 9, also from the protective tube end.

A securing ring 14 is inserted into a continuous groove 17 provided on the connecting piece 9 and the ring 14 is tightened and secured by means of a tensioning bolt 4.

On the side facing the protective funnel or boot 1, the securing ring 14 is provided with a conical collar 3 which extends over the connecting cone or conical connecting portion 2 of the protective funnel 1. On the end facing the protective tube 6, the securing ring is provided with stop faces and it supports itself by means of these stop faces against the locking tongues 5 of the bearing body 8. Thus, by tightening of the securing ring 14, a positive connection is established between the bearing body 8, the connecting piece 9, and the protective funnel 1.

In FIG. 2 there is shown a section taken through the connecting piece 9 which has been provided with a connecting eye 10 for a securing chain (not shown) and including a lubricating nipple 11 for lubricating the bearing.

Figure 3:
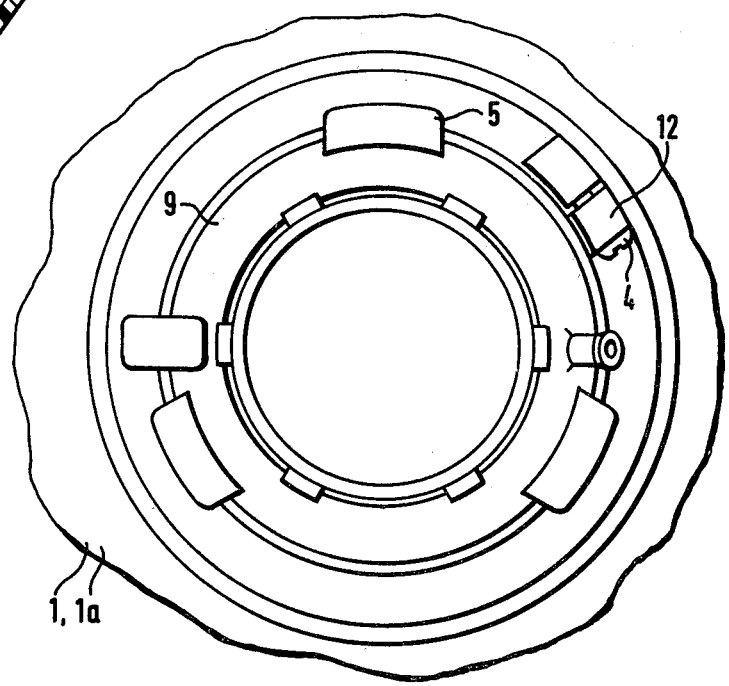
FIG. 3 is an end view of the connecting piece.

FIG. 3 shows the arrangement of the securing ring 14 on the connecting piece 9 and also depicts the manner in which it is fixed by means of tensioning brackets 12 which are tightened by the tensioning bolt 4.

While a specific embodiment of the invention has been shown and described in detail to illustrate the application of the inventive principles, it will be understood that the invention may be embodied otherwise without departing from such principles.

What is claimed is:

1. In a protective device for a universal joint assembly arranged as part of a drive shaft assembly connecting a tractor to an agricultural implement,
   said drive shaft assembly including
      a drive shaft connected to at least one side of a universal joint, and
      a shank member of said universal joint extending from said one side of said universal joint, said shank member having an annular groove formed therein;
   said protective device including
      a protective boot extending to cover said universal joint assembly including a conical connecting portion extending toward said drive shaft, and
      a pair of telescopic protective tubes surrounding said drive shaft, one of said protective tubes having an inner annular groove therein,
   the improvement of a connecting assembly between said protective boot and said pair of telescopic protective tubes, said connecting assembly comprising:
   a connecting piece having
      a funnel-like extension which partially projects into said conical connecting portion of said protective boot to support said conical connecting portion, said conical connection portion of said protective boot terminating on said funnel-like extension,
      through-holes,
      a continuous outer groove and
      locking means engaging in said inner annular groove of said one protective tube to hold said connecting piece against axial displacement relative to said one protective tube;
   an annular bearing body having
      a protuberance engaging into said annular groove formed in said shank member, and
      locking tongues received in said through-holes of said connecting piece; and
   a securing ring extending about and engaged within said continuous outer groove in said connecting piece, said securing ring having
      a stop face axially fixing said locking tongues in said through-holes and
      a conical collar having a conical configuration which corresponds to the configuration of said funnel-like extension holding said conical connecting portion of said protective boot against said funnel-like extension;
   said through-holes opening toward an end of said connecting piece which is on a side thereof toward said protective boot and having a length which exceeds the width of said continuous outer groove by the thickness of said locking tongues;
   said securing ring being arranged with said conical collar over said conical connecting portion of said protective boot to hold said conical connecting portion pressed between said conical collar and said funnel-like extension of said connecting piece.

* * * * *